(12) United States Patent
Tamm et al.

(10) Patent No.: US 12,541,413 B2
(45) Date of Patent: Feb. 3, 2026

(54) SYSTEMS AND METHODS FOR GENERATING AN ENHANCED ERROR MESSAGE

(71) Applicant: Palantir Technologies Inc., Denver, CO (US)

(72) Inventors: Timothy Tamm, Seattle, WA (US); Richard Niemi, Seattle, WA (US); Ivan Charbonneau, Havertown, PA (US); Kevin Lynch, Austin, TX (US); Shelby Vanhooser, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 36 days.

(21) Appl. No.: 18/378,779

(22) Filed: Oct. 11, 2023

(65) Prior Publication Data

US 2024/0126631 A1    Apr. 18, 2024

Related U.S. Application Data

(60) Provisional application No. 63/415,398, filed on Oct. 12, 2022.

(51) Int. Cl.
*G06F 11/00*    (2006.01)
*G06F 11/07*    (2006.01)

(52) U.S. Cl.
CPC ...... *G06F 11/0769* (2013.01); *G06F 11/0766* (2013.01); *G06F 11/079* (2013.01); *G06F 11/0793* (2013.01)

(58) Field of Classification Search
CPC ............ G06F 11/0769; G06F 11/0766; G06F 11/0793; G06F 11/079
See application file for complete search history.

(56) References Cited

U.S. PATENT DOCUMENTS

| | | | |
|---|---|---|---|
| 9,552,249 B1 * | 1/2017 | James | G06F 11/0793 |
| 10,528,454 B1 * | 1/2020 | Baraty | G06F 11/3684 |
| 11,281,517 B2 * | 3/2022 | Kanagovi | G06F 11/2252 |

(Continued)

OTHER PUBLICATIONS

Harvard University; CS50; help50; from https://docs.cs50.net/2016/fall/test/practice/help50/help50.html; 3 pages; Jul. 25, 2017.

*Primary Examiner* — Jonathan D Gibson
(74) *Attorney, Agent, or Firm* — Faegre Drinker Biddle & Reath LLP

(57) ABSTRACT

Systems and methods for generating an enhanced error message are provided. An example method includes: receiving one or more raw error messages. The one or more raw error messages include one or more stack traces. The method further includes matching at least one raw error message of the one or more raw error messages to one or more error rules from a plurality of error rules. The one or more error rules include regular expression patterns. The method further includes parsing the at least one raw error message, based on the one or more matched error rules from the plurality of error rules; and generating one or more enhanced error messages, based on the at least one parsed raw error messages. The one or more enhanced error messages include one or more natural language sentences. The method further includes embedding the one or more enhanced error messages into a website.

20 Claims, 11 Drawing Sheets

(56) References Cited

U.S. PATENT DOCUMENTS

| | | | |
|---|---|---|---|
| 11,379,294 B1* | 7/2022 | A ..................... | G06F 11/0751 |
| 11,579,962 B2* | 2/2023 | Jung ................ | G06F 11/3604 |
| 11,709,726 B2* | 7/2023 | Alavi ............... | G06F 11/0775 |
| | | | 714/37 |
| 11,921,620 B2* | 3/2024 | Varada .............. | G06T 13/80 |
| 12,298,877 B2* | 5/2025 | Sriperambudur ... | G06F 11/3075 |
| 2003/0237035 A1* | 12/2003 | Bowers ............ | H04L 41/0631 |
| | | | 714/724 |
| 2012/0222014 A1* | 8/2012 | Peretz .............. | G06F 11/3684 |
| | | | 717/125 |
| 2014/0068326 A1* | 3/2014 | Quinn .............. | G06F 11/0715 |
| | | | 714/E11.197 |
| 2014/0365828 A1* | 12/2014 | Jiang ............... | G06F 11/0709 |
| | | | 714/37 |
| 2017/0083390 A1* | 3/2017 | Talwadker ........ | G06F 11/0772 |
| 2020/0133823 A1* | 4/2020 | Kumar .............. | G06F 11/006 |
| 2022/0114043 A1* | 4/2022 | Goodsitt ........... | G06F 11/3636 |
| 2022/0253368 A1 | 8/2022 | DeMeuse et al. | |
| 2023/0055527 A1* | 2/2023 | Majithia ........... | G06F 11/079 |
| 2024/0126631 A1* | 4/2024 | Tamm .............. | G06F 11/0769 |

\* cited by examiner

FIG. 5

SYSTEMS AND METHODS FOR GENERATING AN ENHANCED ERROR MESSAGE

CROSS REFERENCE TO RELATED APPLICATIONS

This application claims priority to U.S. Provisional Application No. 63/415,398, entitled "SYSTEMS AND METHODS FOR GENERATING AN ENHANCED ERROR MESSAGE," filed on Oct. 12, 2022, which is incorporated by reference herein for all purposes in its entirety.

TECHNICAL FIELD

Certain embodiments of the present disclosure relate to generating error messages. More particularly, some embodiments of the present disclosure relate to generating user-friendly error messages based on raw error messages that include stack traces.

BACKGROUND

Conventional systems may generate error messages that may be difficult for an average user of the system to understand. For example, a portion of an error message that can provide helpful information may be buried among many lines of stack traces (e.g., generated by the systems). Therefore, spotting a helpful component of an error message can be difficult, and require knowledge from users who are experienced in reading such error messages.

Hence, it is desirable to improve techniques for generating error messages.

SUMMARY

Certain embodiments of the present disclosure relate to generating enhanced error messages. More particularly, some embodiments of the present disclosure relate to generating user-friendly error messages based on raw error messages that include stack traces.

At least some aspects of the present disclosure are directed to a method for generating an enhanced error message. The method includes receiving one or more raw error messages. The one or more raw error messages include one or more stack traces. The method further includes matching at least one raw error message of the one or more raw error messages to one or more error rules from a plurality of error rules. The one or more error rules include regular expression patterns. The method further includes parsing the at least one raw error message, based on the one or more matched error rules from the plurality of error rules; and generating one or more enhanced error messages, based on the at least one parsed raw error messages. The one or more enhanced error messages include one or more natural language sentences. The method further includes coupling to a software via a software plugin configured to provide a visual representation of the one or more enhanced error messages. The method is performed using one or more processors.

At least some aspects of the present disclosure are directed to a system for generating an enhanced error message. The system includes one or more processors and one or more memories having instructions that, when executed by the one or more processors, cause the system to perform a set of operations that include receiving one or more raw error messages. The one or more raw error messages include one or more stack traces. The set of operations further include matching at least one raw error message of the one or more raw error messages to one or more error rules from a plurality of error rules. The one or more error rules include regular expression patterns. The set of operations further include parsing the at least one raw error message, based on the one or more matched error rules from the plurality of error rules; and generating one or more enhanced error messages, based on the at least one parsed raw error messages. The one or more enhanced error messages include one or more natural language sentences. The set of operations further include coupling to a software via a software plugin configured to provide a visual representation of the one or more enhanced error messages.

At least some aspects of the present disclosure are directed to a method for generating an enhanced error message. The method includes receiving one or more raw error messages. The one or more raw error messages include one or more stack traces. The method further includes matching at least one raw error message of the one or more raw error messages to one or more error rules from a plurality of error rules. The one or more error rules include regular expression patterns. The method further includes parsing the at least one raw error message, based on the one or more matched error rules from the plurality of error rules; and generating one or more enhanced error messages, based on the at least one parsed raw error messages. The one or more enhanced error messages include a title, a description of the one or more raw error messages, a portion of code from the one or more stack traces that is relevant to the one or more raw error messages, and a recommendation to correct a problem associated with the one or more raw error messages. The method further includes coupling to a software via a software plugin configured to provide a visual representation of the one or more enhanced error messages.

Depending upon embodiment, one or more benefits may be achieved. These benefits and various additional objects, features and advantages of the present disclosure can be fully appreciated with reference to the detailed description and accompanying drawings that follow.

BRIEF DESCRIPTION OF THE DRAWINGS

FIG. 5 illustrates an example user interface, according to certain embodiments of the present disclosure.

DETAILED DESCRIPTION

Figure 1:
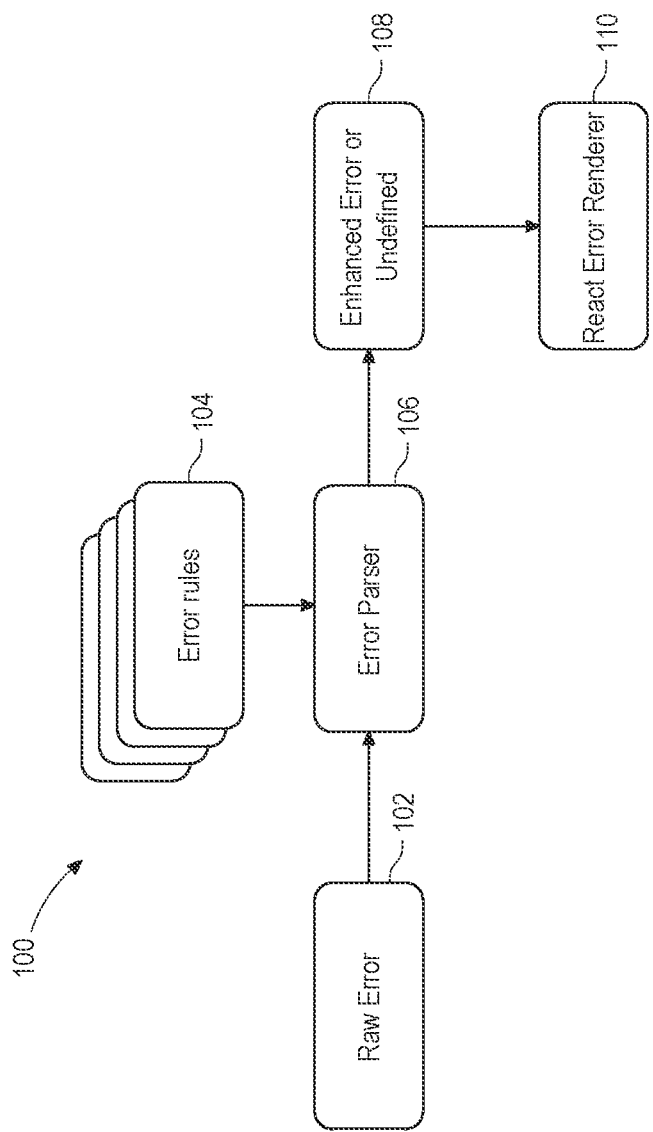
FIG. 1 illustrates an example flow, according to certain embodiments of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in a same software. In certain embodiments, the term "access" or "accessing" means retrieving data or information, and/or generating data or information.

Conventional systems and methods are often not capable of generating error messages that are easy for an average user to understand. For example, conventional systems and methods may generate error messages that include long stack traces of code, without concise and/or grammatically correct sentences that indicate to a user what is the origin/cause of the error messages. Accordingly, conventional systems and methods may require individuals with tribal knowledge (e.g., knowledge within an organization, held by one or more individuals, that is not widely known) of how to locate helpful aspects of an error message. Such conventional systems and methods are inefficient because they require manually traversing large stack traces, while also requiring the availability of someone with the knowledge of how to traverse the large stack traces.

Various embodiments of the present disclosure can achieve benefits and/or improvements by a computing system generating one or more enhanced error messages using mechanisms provided herein. In some embodiments, the enhanced error message may be human-readable and user-friendly. For example, the enhanced error message may include a title, a short description of a raw error from which the enhanced error message was generated, a recommendation to correct a problem associated with the raw error message, and/or a snippet of relevant code, based on a stack trace associated with the raw error message, such that a user can quickly locate and known how to correct code relevant to the error message. In some embodiments, the enhanced error message may be provided within a user-interface that includes an overall workflow design, such that users can efficiently correct errors while developing a workflow. In some embodiments, benefits include an improved user-experience (e.g., improved human-computer interaction), by providing error messages that are more human-readable and/or user-friendly. In some embodiments, benefits include improved efficiency in identifying and/or resolving an error, such as by providing a clear indication of what is causing the error and/or a recommendation to correct the error.

According to some embodiments, error messages (e.g., error messages generated by a software platform or a software solution) that are shown to users may be hard to understand for the average user. In some embodiments, a location at which error messages are helpful is buried between many lines of stack traces (e.g., generated by one or more software mechanisms). In some embodiments, a stack trace includes a sequence of function calls and their associated executions contexts that led to an error (e.g., that resulted in the error messages) occurred. In some embodiments, the stack trace is displayed as a list of function calls, with the most recent call at the top and the original call at the bottom. In such embodiments, spotting a helpful component of an error message can be difficult, and require tribal knowledge from users who are experienced in reading such error messages.

At least certain embodiments of the present disclosure are directed to error management software components (e.g., error management systems, error management platforms, error management solutions) configured to compose one or more enhanced error messages (e.g., human-readable messages, user-friendly messages) based upon one or more error inputs. In some embodiments, the error management components are configured to compose one or more error messages by identifying an error source of the one or more error inputs and using one or more error message structures associated with the error source. In certain embodiments, the error message structures are generated by the error management component. In some embodiments, the error message structures are received or retrieved by inputs (e.g., inputs from users, inputs from repositories, inputs via software interfaces, etc.). In certain embodiments, the error source is a third-party software and the associated error message structure is provided by a third party. In some embodiments, the error source includes a first error source associated with a first software and a second error source associated with a second software different from the first software, where the second error source is different from the first error source. In some embodiments, the one or more error sources and/or the one or more error message structures are predetermined at the time of execution of the error message component. In certain embodiments, an error message structure is associated with one or more error rules, that are generated by the error management component and/or received from the error source. In some embodiments, the error management component and/or other software components can generate a task (e.g., a job) for an enhanced error message. In certain embodiments, the error management component and/or other software components can generate a task (e.g., a job) for an enhanced error message, where the task is added to a job-tracker.

According to some embodiments, error management software components display errors (e.g., generated by and/or received by a computing device) in a more human-readable format. In some embodiments, error management software components disclosed herein include a list of regular expression patterns (e.g., regex patterns) that are used to parse errors that users encounter. For example, if error management software components disclosed succeed in parsing an error, then the error management software components will display a more user friendly error message to a user, than conventional error messages. In some embodiments, error management systems disclosed herein extract code portions of stack traces to help identify (e.g., pinpoint, users pinpoints) a source of the errors. In certain embodiments, code portions of stack traces are extracted, without displaying the layers of the stack trace that go into libraries that the user did not write.

In some embodiments, error management solutions disclosed herein can generate/compose error messages including links to relevant documents related to errors (e.g., error inputs). In certain embodiments, error management solutions disclosed herein can extract specific snippets from an original error and insert the snippets to an enhanced error message to provide increased context to a user (e.g., regarding from where an error originated within a stack trace). In some embodiments, a stack trace refers to a series of executable code and/or corresponding source code.

In some embodiments, enhanced error messages are generated throughout various software applications to present more helpful error messages to users. In some embodiments, enhanced error messages may be based on one or more other sources (e.g., user inputs, inputs from another system, crowd-sourcing). In certain embodiments, a user interface allows users to submit human readable messages for errors that mechanisms disclosed herein were unable to match against a set (e.g., collection, database) of regular expression patterns corresponding to the errors. In some embodiments, for errors that mechanisms disclosed herein are able to identify (e.g., pinpoint) a corresponding error source (e.g., the offending piece of code), or where a solution is to apply a specific user profile to a job, such embodiments build a job-tracker and/or a vector plug-in that applies a fix to the offending piece of code, automatically, for the user.

It should be recognized that mechanisms disclosed herein may be used by a plurality of different software applications, in manners that will be recognized by those of ordinary skill in the art.

FIG. 1 illustrates an example flow 100 according to some embodiments described herein. FIG. 1 is merely an example. One of the ordinary skilled in the art would recognize many variations, alternatives, and modifications. In some embodiments, raw errors, such as raw error 102, that various systems may emit, are not user friendly. In some embodiments, the raw errors 102 contain long stack traces that make finding relevant information (e.g., for debugging software) difficult. In certain embodiments, the relevant information that is within the raw error 102 is very technical, which can be hard to parse or understand, for users. In some embodiments, even if the user manages to find and understand relevant information from the raw error 102, the user may not know what caused the raw error 102 and/or how to resolve the raw error 102, thereby leading to an increased burden on experienced individuals to support users in identifying and resolving raw errors, such as the raw error 102.

In some embodiments, certain users can have experience or tribal knowledge, after using platforms that generate raw errors (e.g., the raw error 102) for an extended period time. In such embodiments, the experience or tribal knowledge can help the users to parse errors (e.g., raw error 102). In some embodiments, after seeing errors enough times, users gain intuition for how to parse error logs. For example, if an error vaguely resembles a first pattern that user recognizes, then the user will scroll about two-thirds of the way down an error log corresponding to the error, and will look about one-third to the right of the error log to find a sentence with relevant information for resolving the error. Further examples may be recognized by those of ordinary skill in the art in light of teachings described herein.

In some embodiments, users can learn how to fix common errors after encountering the errors multiple times. In certain embodiments, there may be as many as thousands of potential different errors; however, users encounter the same small subset of errors from the thousands of different errors. Accordingly, in such embodiments, users gain knowledge about where relevant information may be located within the errors, and how to resolve the errors, based on the relevant information.

In some embodiments disclosed herein, mechanisms are provided that capture the experience or tribal knowledge of users related to common errors (e.g., raw error 102) and uses that captured experience or tribal knowledge to generate human readable error message to help users to find helpful information corresponding to an error, to resolve the error. In some embodiments, error rules 104 may be defined based on regular expression patterns to which a respective error, of a plurality of errors, corresponds. In some embodiments, the error rules 104 may be stored in a database. In some embodiments, users may contribute the error rules 104 to a system so that tribal knowledge can continue to be captured, for example as time progresses and/or as platforms that generate raw error messages continue to grow. It should be recognized by those of ordinary skill in the art that mechanisms provided herein may be flexible enough to be used across various aspects of a platform, wherever errors may be generated for and/or displayed to a user (e.g., via a front-end plugin that can be embedding in a website).

Referring still to the example flow 100, in some embodiments, the raw error 102 is obtained or otherwise received. In some embodiments, the raw error 102 may be raw error data, a stack trace, and/or an unformatted error message that corresponds to one of a plurality of different types of errors. Further, in certain embodiments, the raw error 102 may be difficult for a user to read and/or trace, therefore making it difficult for the user to understand and/or correct aspects of an algorithm, based on the raw error 102.

In some embodiments, the raw error 102 and the error rules 104 are received by an error parser 106. In some embodiments, for each rule in the plurality of rules 104, a regular expression pattern corresponding to the respective rule, is matched against the raw error 102. In certain embodiments, if the raw error 102 is determined to match a regular expression pattern of a rule from the plurality of rules 104, then relevant parts from the raw error 102 (e.g., one or more strings from an error log or stack trace corresponding to the raw error 102) are extracted and used to generate an enhanced error 108.

In some embodiments, the enhanced error 108 is a user-friendly message in natural language. In some examples, the enhanced error 108 is generated to be grammatically correct and relatively easy for a user to read. For example, the grammatically correct message may start with a capital letter, include a verb, include a subject, and end with a period (or other punctuation mark to indicate the end of the sentence). In some examples, the grammatically correct message includes commas, semi-colons, colons, or the like (where appropriate/necessary). In some embodiments, the error parser 106 may be unable to match an error rule from the plurality of error rules with the raw error 102, such that the enhanced error 108 is instead undefined. Further, in certain embodiments, a user modifies one or more mechanisms, in response to receiving the enhanced error 108.

In some embodiments, if a match is found between the plurality of rules 104 and the raw error 102, then the enhanced error 108 is passed to a react error renderer or rendering component 110 that displays the enhanced error 108. In some embodiments, the enhanced error 108 may be displayed on a website. For example, the enhanced error 108 may be embedded into the website via a frontend plugin. In some embodiments, the enhanced error 108 includes a human readable title, description, documentation link, and/or original raw error log (e.g., corresponding to the raw error 102) with relevant parts highlighted for the user. In some embodiments, the human readable description includes common steps to resolve the raw error 102 and/or relevant information that is extracted from the raw error 102. In some examples, stack trace lines that are determined to be irrelevant, from the original or raw error 102, can be collapsed, to provide a succinct enhanced error message to a user. In some examples, the enhanced error 108 can further include relevant parts of a user's software code that are related to the raw error 102.

In some embodiments, the react error renderer 110 causes the enhanced error 108 to be displayed. In some embodiments, the enhanced error 108 may be displayed on a website. For example, the enhanced error 108 may be embedded into the website via a frontend plugin. In some embodiments, the react error renderer 110 can be associated with a task (e.g., a job) corresponding to the raw error 102. In some embodiments, the react error renderer 110 is associated with a task corresponding to the raw error 102 being added to a scheduler.

Figure 2:
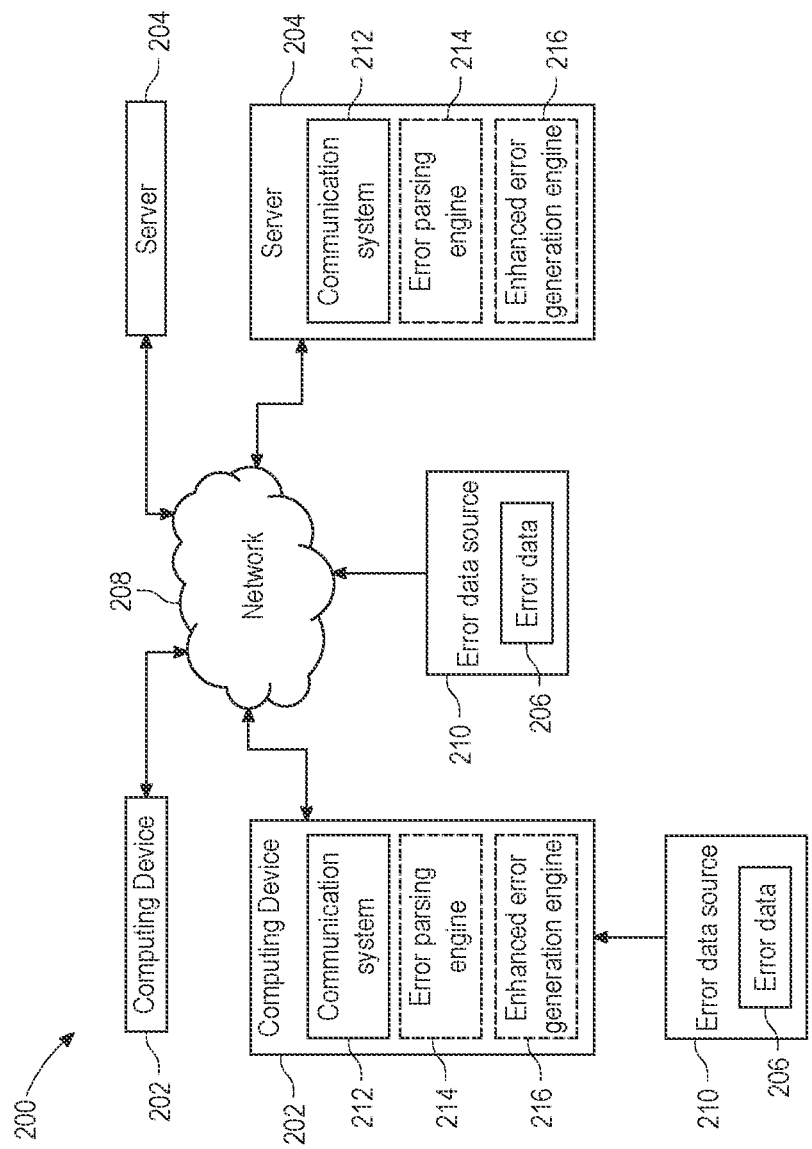
FIG. 2 illustrates an example system, according to certain embodiments of the present disclosure.

FIG. 2 shows an example of a system 200, in accordance with some aspects of the disclosed subject matter. In some embodiments, the system 200 is a system for generating an enhanced error message. FIG. 2 is merely an example. One of the ordinary skilled in the art would recognize many variations, alternatives, and modifications. Although system 200 has been shown using a selected group of components, there can be many alternatives, modifications, and variations. For example, some of the components may be expanded and/or combined. Other components may be inserted into those noted above. Depending upon the example, the arrangement of components may be interchanged with others replaced. Further details of these components are found throughout the present disclosure.

In some embodiments, various components in the system 200 can execute software or firmware stored in non-transitory computer-readable medium to implement various processing steps. In some embodiments, various components and processors of the system 200 can be implemented by one or more computing devices including, but not limited to, circuits, a computer, a cloud-based processing unit, a processor, a processing unit, a microprocessor, a mobile computing device, and/or a tablet computer. In some embodiments, various components of the system 200 can be implemented on a shared computing device. In some embodiments, a component of the system 200 can be implemented on multiple computing devices. In some embodiments, various modules and components of the system 200 can be implemented as software, hardware, firmware, or a combination thereof.

In some embodiments, the system 200 includes one or more computing devices 202, one or more servers 204, one or more error data sources 206, and a communication network or network 208. In some embodiments, the computing device 202 can receive error data 210 from the error data source 206. Additionally, or alternatively, in some embodiments, the network 208 can receive error data 210 from the error data source 206.

In some embodiments, computing device 202 includes a communication system 212, an error parsing engine or component 214, and/or an enhanced error generation engine or component 216. In some embodiments, computing device 202 can execute at least a portion of the error parsing component 214 to determine if raw errors (e.g., raw error 102) that correspond to the error data 210 match to an error rule (e.g., of the plurality of error rules 104). In some embodiments, the error parsing component 214 can further parse the raw error, based on the error rule to which the raw error is determined to match. Further, in some embodiments, the computing device 202 can execute at least a portion of the enhanced error generation engine 216 to generate and/or display a user-friendly message that includes one or more of a human readable title, a human readable description with resolution steps corresponding to the raw error, a link to relevant documents related to the raw error, highlighted parts in the raw error, and/or relevant user code parts that are associated with the raw error.

In some embodiments, server 204 includes a communication system 212, an error parsing engine or component 214, and/or an enhanced error generation engine or component 216. In some embodiments, server 204 can execute at least a portion of the error parsing component 214 to determine if raw errors (e.g., raw error 102) that correspond to the error data 210 match to an error rule (e.g., of the plurality of error rules 104). In some embodiments, the error parsing component 214 can further parse the raw error, based on the error rule to which the raw error is determined to match. Further, in some embodiments, the server 204 can execute at least a portion of the enhanced error generation engine 216 to generate and/or display a user-friendly message that includes one or more of a human readable title, a human readable description with resolution steps corresponding to the raw error, a link to relevant documents related to the raw error, highlighted parts in the raw error, relevant user code parts that are associated with the raw error, and/or a task or job that is associated with the raw error.

Additionally, or alternatively, in some embodiments, computing device 202 can communicate data received from error data source 206 to the server 204 over a communication network 208, which can execute at least a portion of the error parsing component 214 and/or the enhanced error generation component 216. In some embodiments, the error parsing component 214 executes one or more portions of methods/processes disclosed herein and/or recognized by those of ordinary skill in the art, in light of the present disclosure. In some embodiments, the enhanced error generation component 216 executes one or more portions of methods/processes disclosed herein and/or recognized by those of ordinary skill in the art, in light of the present disclosure.

In some embodiments, computing device 202 and/or server 204 can be any suitable computing device or combination of devices, such as a desktop computer, a vehicle computer, a mobile computing device (e.g., a laptop computer, a smartphone, a tablet computer, a wearable computer, etc.), a server computer, a virtual machine being executed by a physical computing device, a web server, etc. Further, in some embodiments, there may be a plurality of computing device 202 and/or a plurality of servers 204.

In some embodiments, error data source 206 can be any suitable source of error data (e.g., data generated from a computing device, data stored in a repository, data generated from a software solution, etc.) In some embodiments, error data source 206 can include memory storing error data (e.g., local memory of computing device 202, local memory of server 204, cloud storage, portable memory connected to computing device 202, portable memory connected to server 204, etc.). In some embodiments, error data source 206 can include an application configured to generate error data and provide the error data via a software interface. In some embodiments, error data source 206 can be local to computing device 202. In some embodiments, error data source 206 can be remote from computing device 202, and can communicate error data 210 to computing device 202 (and/or server 204) via a communication network (e.g., communication network 208).

In some embodiments, the error data source 206 may include a repository that is implemented using any one of the configurations described below. In some embodiments, a data repository may include random access memories, flat files, XML files, and/or one or more database management systems (DBMS) executing on one or more database servers or a data center. In some embodiments, a database management system may be a relational (RDBMS), hierarchical (HDBMS), multidimensional (MDBMS), object oriented (ODBMS or OODBMS) or object relational (ORDBMS) database management system, and the like. In some embodiments, the data repository may be, for example, a single relational database. In some embodiments, the data repository may include a plurality of databases that can exchange and aggregate data by data integration process or software application. In some embodiments, at least part of the data repository may be hosted in a cloud data center. In some embodiments, a data repository may be hosted on a single computer, a server, a storage device, a cloud server, or the like. In some embodiments, a data repository may be hosted on a series of networked computers, servers, or devices. In some embodiments, a data repository may be hosted on tiers of data storage devices including local, regional, and central.

In some embodiments, the error data 210 may include a raw error, a stack trace, an indication of an error source, an unformatted error message, an error message structure, and/or a set or error rules. In some embodiments, the stack trace includes a report of information about one or more subroutines of an algorithm. In some embodiments, the set of error rules include regular expression patterns (e.g., regex patterns) that specify a search pattern in text (e.g., a string that corresponds to the raw error, the stack trace, and/or the unformatted error message). In some embodiments, the error data 210 includes an indication of a task and/or job associated with the raw error.

In some embodiments, communication network 208 can be any suitable communication network or combination of communication networks. For example, communication network 208 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some embodiments, communication network 208 can be a local area network (LAN), interfaces conforming known communications standard, such as Bluetooth® standard, IEEE 802 standards (e.g., IEEE 802.11), a ZigBee® or similar specification, such as those based on the IEEE 802.15.4 standard, a wide area network (WAN), a public network (e.g., the Internet), a private or semi-private network (e.g., a corporate or university intranet), any other suitable type of network, or any suitable combination of networks. In some embodiments, communication links (arrows) shown in FIG. 2 can each be any suitable communications link or combination of communication links, such as wired links, fiber optics links, Wi-Fi links, Bluetooth® links, cellular links, satellite links, etc.

Figure 3:
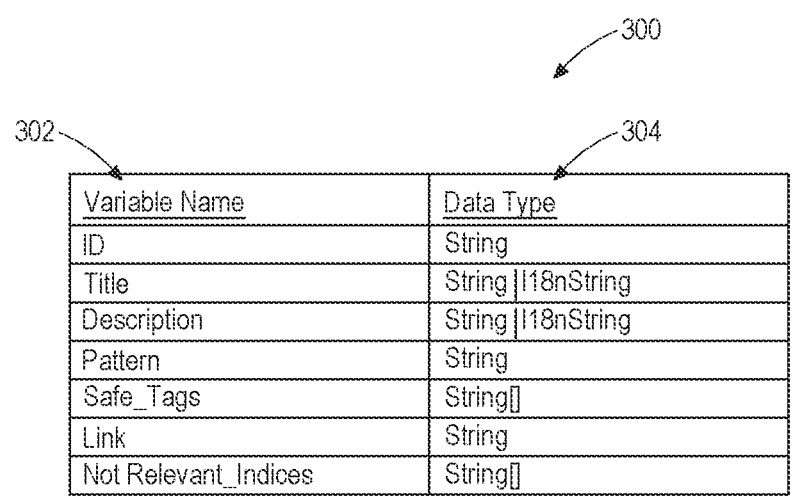
FIG. 3 illustrates an example data structure of an error rule, according to certain embodiments of the present disclosure.

FIG. 3 illustrates an example data structure 300 of an error rule, according to some embodiments disclosed herein. In some embodiments, the example data structure 300 includes a set of variables, each variable including a variable name 302 and a data type 304. In some embodiments, each of the variable names 302 has a corresponding data type 304.

In some embodiments, the variable names 302 includes an "ID." In some embodiments, the "ID" corresponds to a String data type. In some embodiments, the "ID" is used for logging and metrics corresponding to an error. In some embodiments, the "ID" is unique, descriptive, and/or lower-kebab-cased. In some embodiments, the "ID" is only defined statically, as it may be safe-logged.

In some embodiments, the variable names 302 includes a "TITLE." In some embodiments, the "TITLE" corresponds to a String data type and/or an I18nString data type. In some embodiments, the "TITLE" is a user-facing title of an error. In some embodiments, the "TITLE" is a relatively short String, but is clear enough to provide a user with an understanding of a type of problem to which an error corresponds, relatively quickly.

In some embodiments, the variable names 302 includes a "DESCRIPTION." In some embodiments, the "DESCRIPTION" corresponds to a string data type (e.g., various string data types). In some embodiments, the "DESCRIPTION" is a user-facing description of an error.

In some embodiments, the variable names 302 includes a "PATTERN." In some embodiments, the "PATTERN" corresponds to a string data type. In some embodiments, the "PATTERN" identified patterns within a raw error that may be used to correlate the raw error to a corresponding error rule, based on which relevant information may be parsed from the raw error.

In some embodiments, the variable names 302 includes a "SAFE_TAGS." In some embodiments, the "SAFE_TAGS" corresponds to a data structure containing values, such as, for example, an array of String data types. In some embodiments, the "SAFE_TAGS" corresponds to tags used for analysis of a type of error users are seeing. In some embodiments, a first plurality of errors correspond to a first type of error and a second plurality of errors correspond to a second type of error.

In some embodiments, the variable names 302 includes a "LINK" (e.g., "ROSETTA_LINK"). In some embodiments, the "LINK" corresponds to a string data type. In some embodiments, the "LINK" is a link to relevant documents, such as, for example, software documents. In some embodiments, different types of documents to which a link can be provided may be recognized by those of ordinary skill in the art.

In some embodiments, the variable names 302 includes a "NOT_RELEVANT_INDICES." In some embodiments, the "NOT_RELEVANT_INDICES" corresponds to a data structure containing values, such as, for example, an array of number data types. In some embodiments, the "NOT_REL-EVANT_INDICES" corresponds to indices of matches found in a raw error, in view of an error rule, that will not be highlighted when rendered, using error management components described herein. For example, in some embodiments, it may be useful to locate which portions of a raw error are useful to generate an enhanced error message (e.g., a user-friendly, human-readable message), and which portions of the raw error are not useful to generate the enhanced error message (e.g., which portions of the message should not be highlighted to a user). In some embodiments, the "NOT_RELEVANT_INDICES" are indices that are identified, but are determined to not be relevant to a user, and therefore will not be highlighted for a user.

Figure 4:
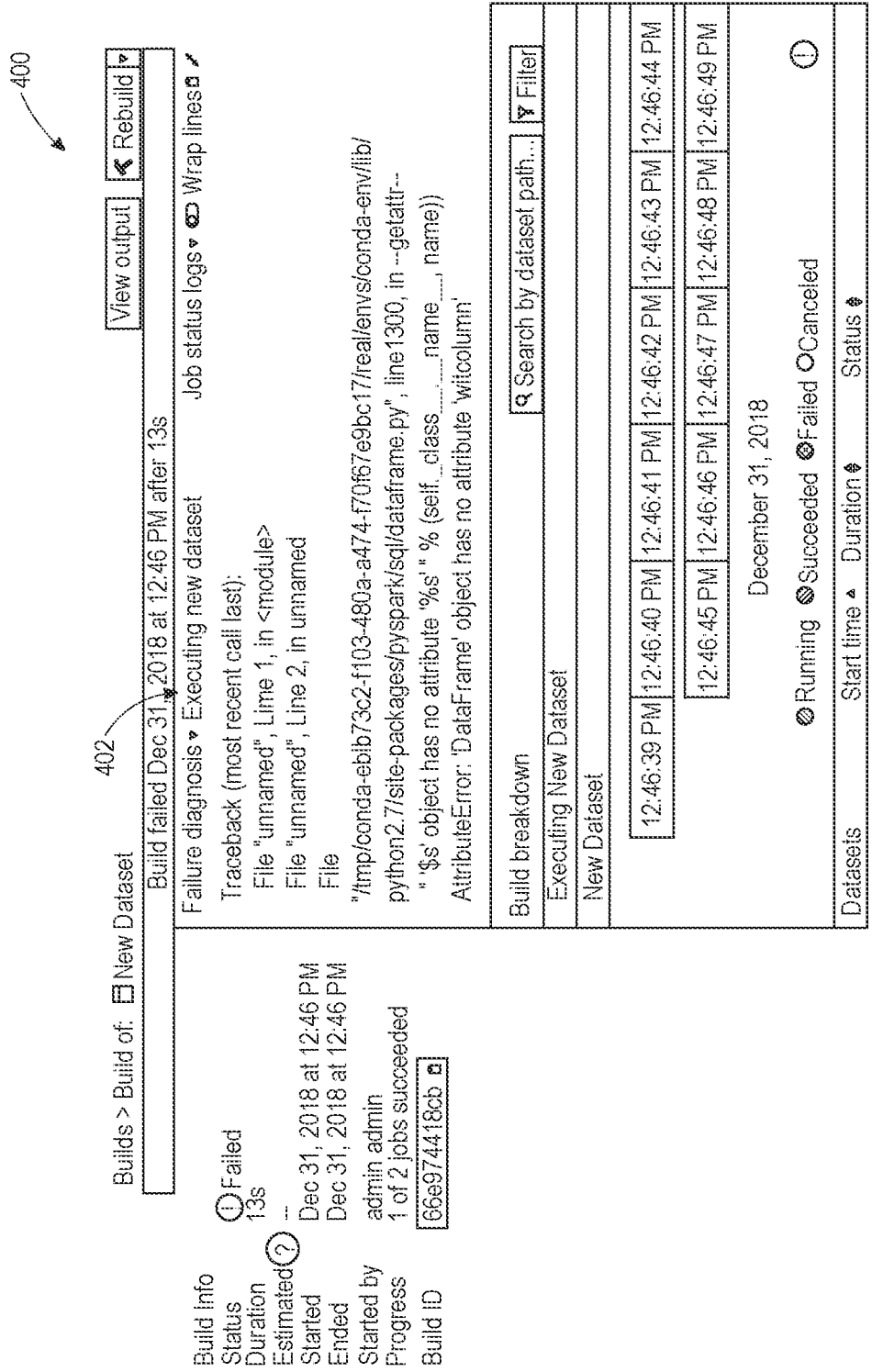
FIG. 4 illustrates an example user interface, according to certain embodiments of the present disclosure.

FIG. 4 illustrates an example user interface 400 according to some embodiments provided herein. In some embodiments, the user interface 400 includes a virtual page, such as a webpage. In some embodiments, the example user interface 400 includes a raw error message (e.g., an error input, a raw error) 402, before being enhanced using error management components described herein. In some embodiments, raw error messages that are shown to users, such as the raw error message 402, are hard to understand for an average user. In some embodiments, aspects of the raw error message 402 that are helpful are often buried between lines of stack traces. In some embodiments, since it is hard to spot helpful aspects of the raw error message 402 that are buried between lines of stack traces, deep tribal knowledge may be required for users.

In some embodiments, error management systems described herein take raw error messages, such as the raw error message 402, and try to match them against a set of error rules (e.g., containing regular expression patterns) to offer a more human readable response to the user. In some embodiments, each human readable response or enhanced error message has short "title" and can have a longer explanation that includes tips for resolving a problem with which the raw error message is associated.

In some embodiments, there are three main classes of users who interact with error management platforms disclosed herein; namely, a beginner user, a power user, and a support provider. In some embodiments, the beginner user is the most common user. In some embodiments, the beginner user has enough technical skills to write some software code, such as, for example, using SQL or python, but are not familiar with other technical skills. In some embodiments, the beginner users rely on experienced individuals who understand raw errors to understand the errors themselves, until the beginner users gain enough tribal knowledge themselves. In some embodiments, error management platforms disclosed herein would empower the beginner users to solve problem related to raw error messages, themselves, without seeking help from experienced individuals.

In some embodiments, the power users are experienced users who are proficient with a platform. In some embodiments, the power users are able to parse most errors themselves, but have to scroll through stack traces to find the right part of a raw error message that provides information for resolving a problem to which the raw error message is associated.

In some embodiments, the support providers are teams that are on the line to help end users and deal with questions about stack traces, on a regular basis. In some embodiments, instead of helping people on one-off basis with no compounding value, support providers, using error management platforms described herein, may only need to solve a problem associated with a raw error message once. In some embodiments, after the support provider solves the problem with the raw error message, an error rule associated with the raw error message may be stored in a database against which similar raw error message can be matched in the future. In some embodiments, error management platforms disclosed herein can provide instructions to resolve the problem associated with the raw error message, automatically, based on the raw error messaged being matched with a corresponding error rule (e.g., from a database containing a plurality of error rules).

Figure 5:
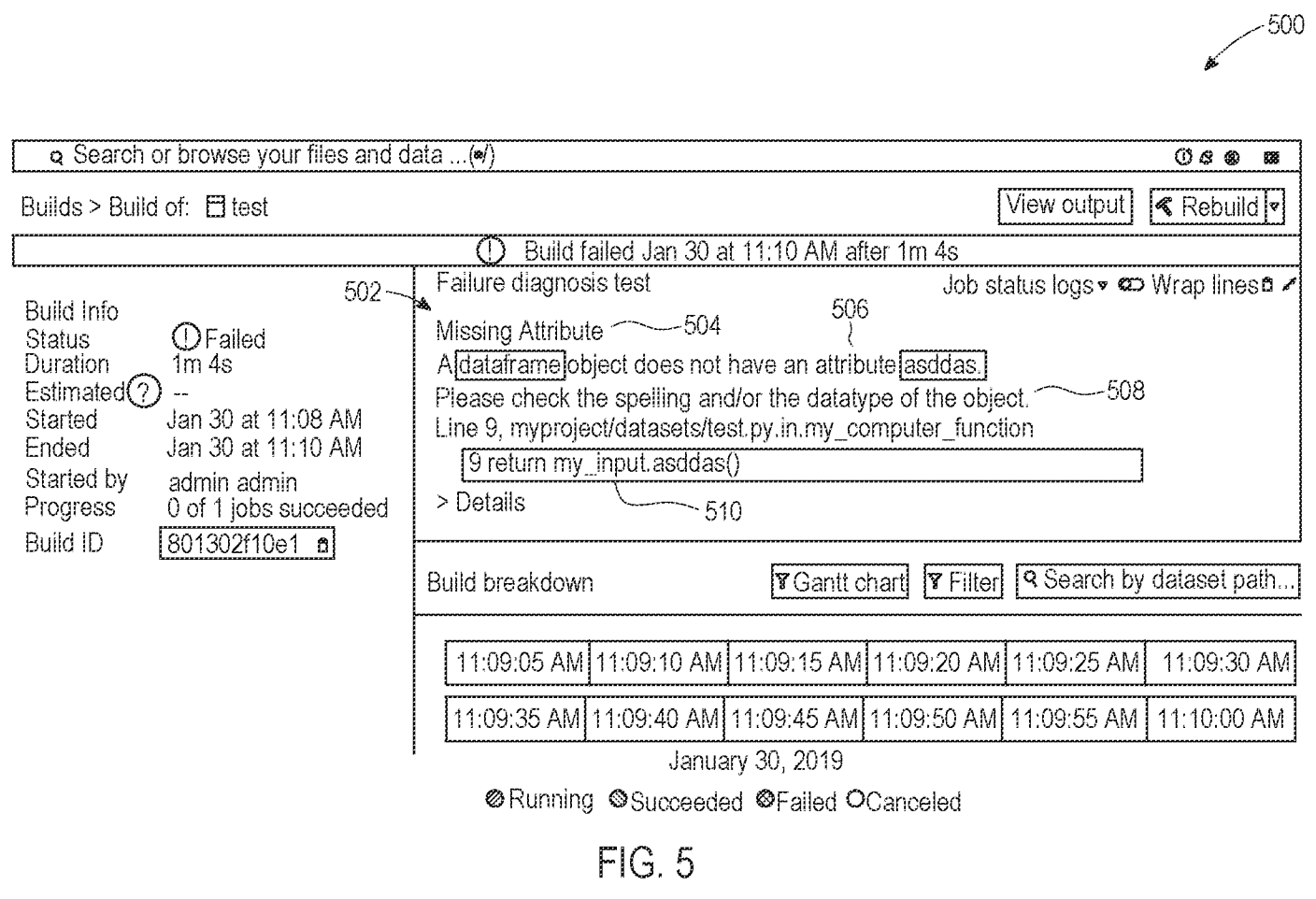

FIG. 5 illustrates an example user interface 500 according to some embodiments provided herein. In some embodiments, the user interface 500 includes a virtual page, such as a webpage. In some embodiments, the example user interface 500 includes an enhanced error message 502, which was enhanced from a raw error message (e.g., raw error message 402) using error management software components described herein. In some embodiments, the enhanced error message 502 includes a title 504, a short description 506 of the raw error from which the enhanced error message was generated, a recommendation 508 to correct a problem associated with the raw error message, and/or a snippet of relevant code 510, based on a stack trace associated with the raw error message. In some embodiments, the short description 506 and the recommendation 508 are user-friendly, human readable sentences that allow a user to quickly diagnose and correct a problem associated with a raw error. It should be recognized that the example user interface 500 is merely an example and that other examples may be recognized by those of ordinary skill in the art, in light of teachings described herein.

Figure 6:
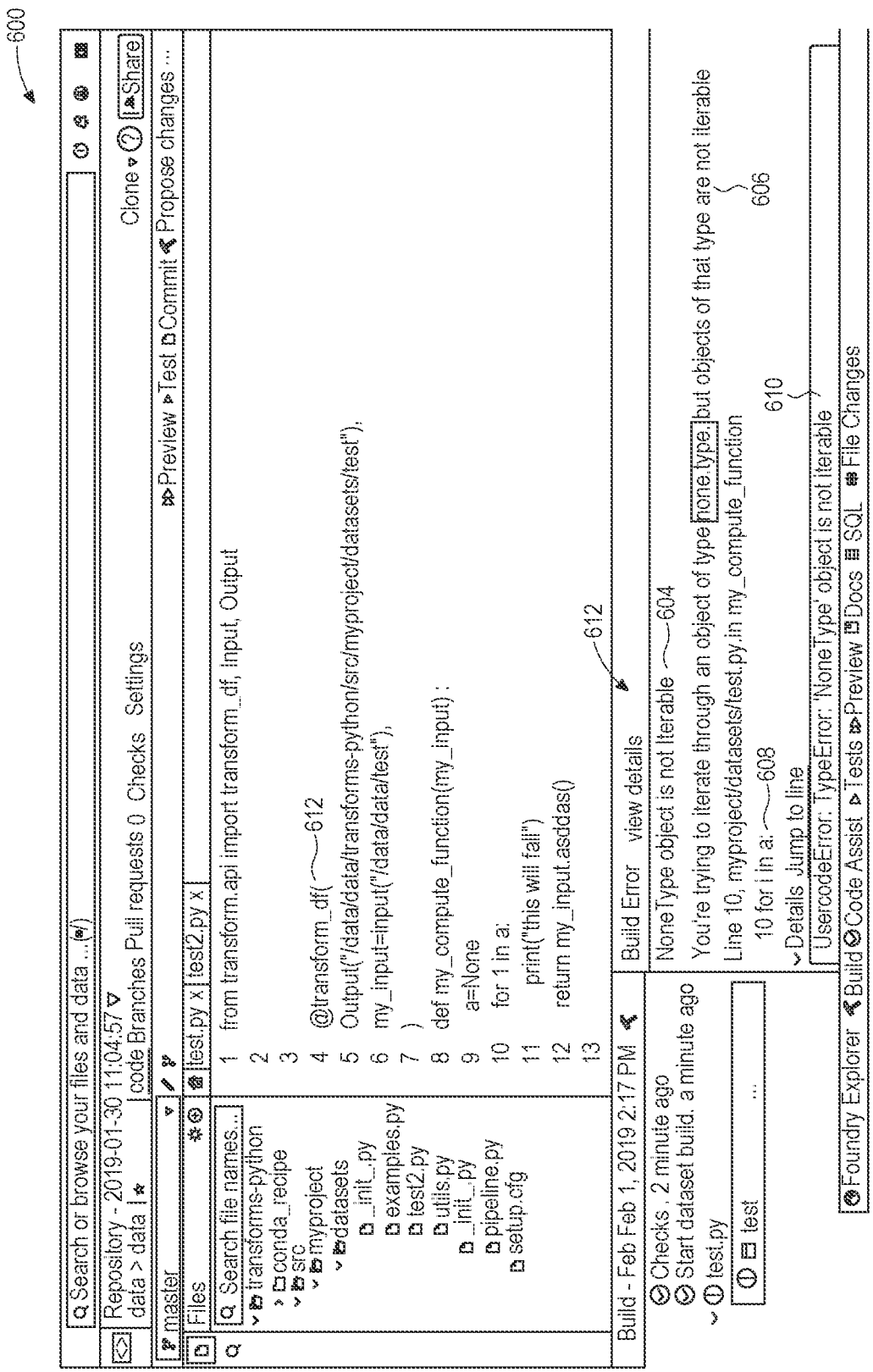
FIG. 6 illustrates an example user interface, according to certain embodiments of the present disclosure.

FIG. 6 illustrates an example user interface 600 according to some embodiments provided herein. In some embodiments, the user interface 600 includes a virtual page, such as a webpage. In some embodiments, the example user interface 600 includes an enhanced error message 602, which was enhanced from a raw error message (e.g., raw error message 402) using error management software components described herein. In some embodiments, the enhanced error message 602 includes a title 604, a short description 606 of the raw error from which the enhanced error message was generated, and/or a snippet of relevant code 608, based on a stack trace associated with the raw error message. In some embodiments, the short description 606 is a user-friendly, human readable sentences that allow a user to quickly diagnose and correct a problem associated with a raw error.

In some embodiments, the enhanced error message 602 further includes at least a portion of a stack trace 610 that corresponds to the raw error. In some embodiments, the stack trace 610 can be hidden or displayed on the user interface 600, based on user-input. In some embodiments the user-interface includes a workbook, display panel, document, and/or editor 612 for editing and/or displaying software code. It should be recognized that the example user interface 600 is merely an example and that other examples may be recognized by those of ordinary skill in the art, in light of teachings described herein.

Figure 7:
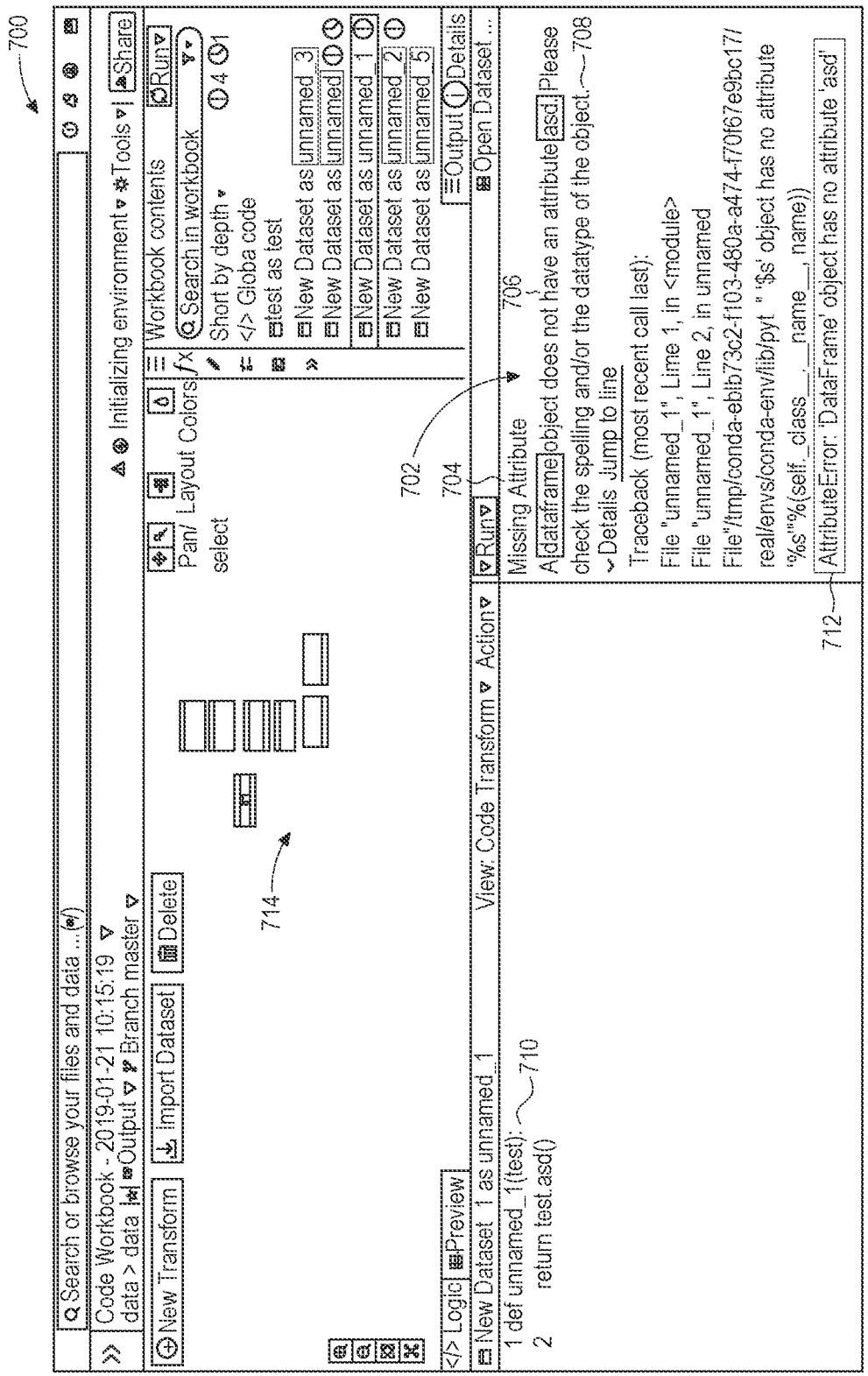
FIG. 7 illustrates an example user interface, according to certain embodiments of the present disclosure.

FIG. 7 illustrates an example user interface 700 according to some embodiments provided herein. In some embodiments, the user interface 700 includes a virtual page, such as a webpage. In some embodiments, the example user interface 700 includes an enhanced error message 702, which was enhanced from a raw error message (e.g., raw error message 402) using error management software components described herein. In some embodiments, the enhanced error message 702 includes a title 704, a short description 706 of the raw error from which the enhanced error message was generated, a recommendation 708 to correct a problem associated with the raw error message, and/or a snippet of relevant code 710, based on a stack trace associated with the raw error message. In some embodiments, the short description 706 and the recommendation 708 are user-friendly, human readable sentences that allow a user to quickly diagnose and correct a problem associated with a raw error.

In some embodiments, the enhanced error message 702 further includes at least a portion of a stack trace 712 that corresponds to the raw error. In some embodiments, the stack trace 712 can be hidden or displayed on the user interface 700, based on user-input. In some embodiments the user-interface includes an overall workflow design 714 that includes a plurality of workflow levels. In some embodiments, error management components described herein indicate from which of the plurality of workflow levels, of the overall workflow design 714, the raw error message originates. It should be recognized that the example user interface 700 is merely an example and that other examples may be recognized by those of ordinary skill in the art, in light of teachings described herein.

Figure 8:
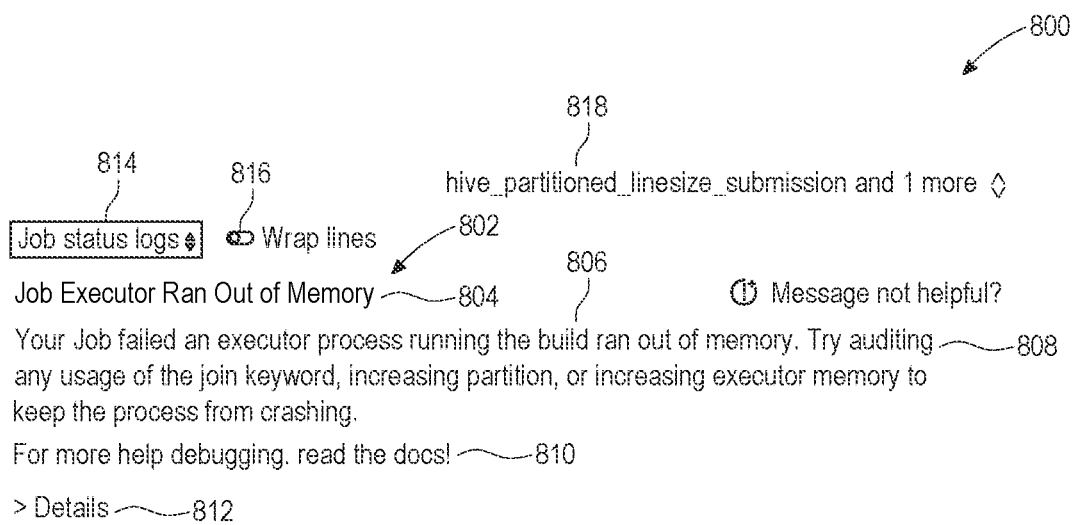
FIG. 8 illustrates an example user interface, according to certain embodiments of the present disclosure.

FIG. 8 illustrates an example user interface 800 according to some embodiments provided herein. In some embodiments, the user interface 800 includes a virtual page, such as a webpage. In some embodiments, the example user interface 800 includes an enhanced error (e.g., an enhanced error message) 802, which was enhanced from a raw error message (e.g., raw error message 402), using error management components described herein. In some embodiments, error management components described herein include an internal list of patterns that are used to try and parse errors that a user encounters. In some embodiments, error management components may parse the errors, based on a data structure for an error rule, such as the data structure 300, described earlier herein with respect to FIG. 3, which contains, for example, an "ID", "TITLE", "DESCRIPTION", "PATTERN", etc. In some embodiments, if error management software components provided herein succeed in parsing the error, then a more user-friendly error message will be displayed to the user. In some embodiments, an error management component can generate a task (e.g., a job) to resolve an error, where the task can be supported in a job-tracker, during runtime.

In some embodiments, the example user interface 800 is part of a job-tracker that can display job statuses. In some embodiments, the enhanced error 802 includes a title 804, a short description 806 of the raw error from which the enhanced error message was generated, a recommendation 808 to correct a problem associated with the raw error message, and/or a link to relevant documents 810 to assist in debugging a problem associated with the raw error. In some embodiments, the short description 806 and the recommendation 808 are user-friendly, human readable sentences that allow a user to quickly diagnose and correct a problem associated with a raw error.

In some embodiments, the enhanced error message 802 further includes at least a portion of a stack trace 812 (hidden in FIG. 8) that corresponds to the raw error. In some embodiments, the enhanced error message 802 further includes details such as a third party software associated with an error, a time associated with an error, and/or other details that may be recognized by those of ordinary skill in the art. In some embodiments, the stack trace 812 can be hidden or displayed on the user interface 800, based on user-input. In some embodiments, by choosing to show the stack trace 812, the stack trace 812 will be revealed and mechanism disclosed herein will highlight one or more portions of the stack trace 812 that were parsed using error management solutions described herein to generate one or more aspects of the enhanced error 802.

In some embodiments, the user-interface 800 includes a job status indicator 814. In some embodiments, the job status indicator 814 is selectable, such that in response to being selected, an enhanced error related to a job status (e.g., the enhanced error 802) is generated and/or displayed. In some embodiments, the user-interface 800 includes a formatting option 816. For example, the formatting option 816 may be a wrap lines control that wraps the lines of text, such as the short description 806. Other types of formatting options may be recognized by those of ordinary skill in the art.

In some embodiments, the user-interface 800 includes a stack trace selector 818. For example, the stack trace selector 818 may correspond to "hive_partitioned_line_size submission." In some embodiments, a user can navigate a stack trace, by using the stack trace selector 818. For example, selecting the stack trace selector 818 can generate a plurality of options, for portions of a stack trace, to which a user can navigate. In some embodiments, by selecting an option from the plurality of options for portions of the stack trace, the user-interface 800 is updated, based on the selection. It should be recognized that the example user interface 800 is merely an example and that other examples may be recognized by those of ordinary skill in the art, in light of teachings described herein.

In some embodiments, platforms that generate raw errors are not very user friendly. In some embodiments, the raw errors contain long stack traces that make it difficult to find relevant information from the raw errors. In some embodiments, even if one were able to find the relevant information, the relevant information may be highly technical, and therefore hard for less technical users to understand. In some embodiments, even if the user managed to find relevant information within the raw error understood what the relevant information was saying, it still may not be enough to resolve the problem, because a user may not know what the typical causes or solutions are for problems associated with the raw error. In some embodiments, platforms that generate raw errors require high support from engineers.

In some embodiments, engineers and power users gain tribal knowledge related to identifying and resolving problems, based on raw errors, that is helpful for parsing the raw errors. In some embodiments, there are thousands of potential errors that various systems could emit; however, consistent with the 80-20 rule (e.g., Pareto Principle) in programming, most of the time the users encounter a small subset of all possible errors. In some embodiments, methods and systems use tribal knowledge associated with raw errors, for at least the most common errors, to display human readable error messages, with other additional information, instead of displaying a raw stack trace.

In some embodiments, even if better errors are able to be generated for the 20 most common errors that a user receives, that may still cover about 40%, about 50%, or even about 60% of the errors that users see, and therefore provide users with an improved user experience. In some embodiments, it is relatively easy to contribute new error rules to error management systems described herein. In some embodiments, therefore, as more tribal knowledge is gained for various errors, more solutions for understanding and addressing the various errors can be captured using error management systems described herein.

In some embodiments, there is an error parser that takes in a plurality of error rules. In some embodiments, the error rules all contain some pattern that it searches for within a raw error log. In some embodiments, the error parser then looks at the raw error, tries to match every single rule against it, and if there is a match, the error parser outputs an enhanced error, or if there is not a match, then the error parser outputs an undefined. In some embodiments, the enhanced error contains a human readable title, a human readable description, and/or some highlighted parts of the original error log. In some embodiments, the enhanced error includes a link to relevant documentation and/or a description of the error can also contain common causes and fixes for the problem.

In some embodiments, the error rules include an ID that is helpful for logging to see which kinds of rules are most often matched to raw errors, a user-facing title, and/or a description. In some embodiments, the error rules include a pattern, which is a regular expression. In some embodiments, the error rules include tags, which can be used for analyzing the types of errors being seen.

In some embodiments, the basic steps for the parser are that, for every rule, the parser matches the rules regular expression pattern against the error log. In some embodiments, if there is match, the error parser extracts relevant parts from the error log. In some embodiments, if the match is found from the parser, an enhanced error is passed to a vendor component that displays the human readable title description, documentation link, and/or original raw log with relevant parts highlighted to the user. In some embodiments, including the original error log in the enhanced error message is helpful because if a user does not think that the human readable message of the enhanced error was helpful enough, there is always the fall back that they can go and read an original raw error log (e.g., stack trace). In some embodiments, the raw error is a string data type and/or raw text. In some embodiments, a matching between a raw error and an error rule is a 100% match.

In some embodiments, raw error messages might come from any one of a million different places. For example, it might be that pipelines are not working, or an internal message from the system, or an API call that is not working, or a repository is not working. In some embodiments, raw error messages may results from systems that are maintained by different people.

In some embodiments, one or more repositories containing the error rules in an open-source repository. In some embodiments, users can create error rules to contribute to the open-source repository. In some embodiments, users can create error rules for a plurality of different systems and/or a plurality of different programming languages with which raw errors may be associated. In some embodiments, error management components disclosed herein may be trained to correct problems, automatically, based on a generated enhanced error. For example, if an enhanced error indicates that a word is misspelled, then error management components disclosed herein can correct the spelling of the misspelled word. As another example, if it is determined that a profile needs to be configured with specific settings, error management components disclosed herein can reconfigure the profile with the specific settings. In some embodiments, the ability to automatically correct problems, and the actions taken to automatically correct the problems, are part of the error rules, which can be open source.

In some embodiments, a match between a raw error and an error rule is a 100% match. In some embodiments, a match between a raw error and an error rule includes a matching rule of less than 100% (e.g., a matching rule of 50% or higher, a matching rule of 60% or higher, a matching rule of 70% or higher, a matching rule of 80% or higher, a matching rule of 90% or higher). For example, a similarity score can be calculated between two strings (e.g., a first string corresponding to the raw error and a second string corresponding to the error rule). In some examples, the similarity score is calculated between one or more substrings (e.g., in the raw error). In some embodiments, if the similarity score is greater than a predetermined threshold, then the raw error and the error rule associated with the two strings can be determined to be a match, and a parser can parse the raw error, based on the error rule, to generate an enhanced error message. In some embodiments, the matching between the raw error and an error rule is based on semantic similarity between the raw error and the error rule. In some examples, the matching is based on comparisons between embeddings generated based on the raw error and an error rule. In some examples, a machine learning model and/or deep learning model is trained to match the raw error to an error rule (e.g., based on a dataset of known matches between raw errors and error rules).

In some embodiments, when there is not a 100% match between a raw error and any error rules, then the raw error can be parsed based on a plurality of error rules, to generate a plurality of possible enhanced error messages. In some embodiments, the plurality of possible enhanced error messages are ranked based on a percentage match between the raw error and an error rule, of the plurality of error rules, from which a respective enhanced error message, of the plurality of enhanced error messages, is based.

In some embodiments, users can provide feedback regarding whether an enhanced error message, that was generated based on an error rule, is helpful. In some embodiments, if it is determined that the enhanced error message, generated based on the error rule, is not helpful, based on the user feedback, then the error rule can be deleted (e.g., from a repository that stores error rules).

Figure 9:
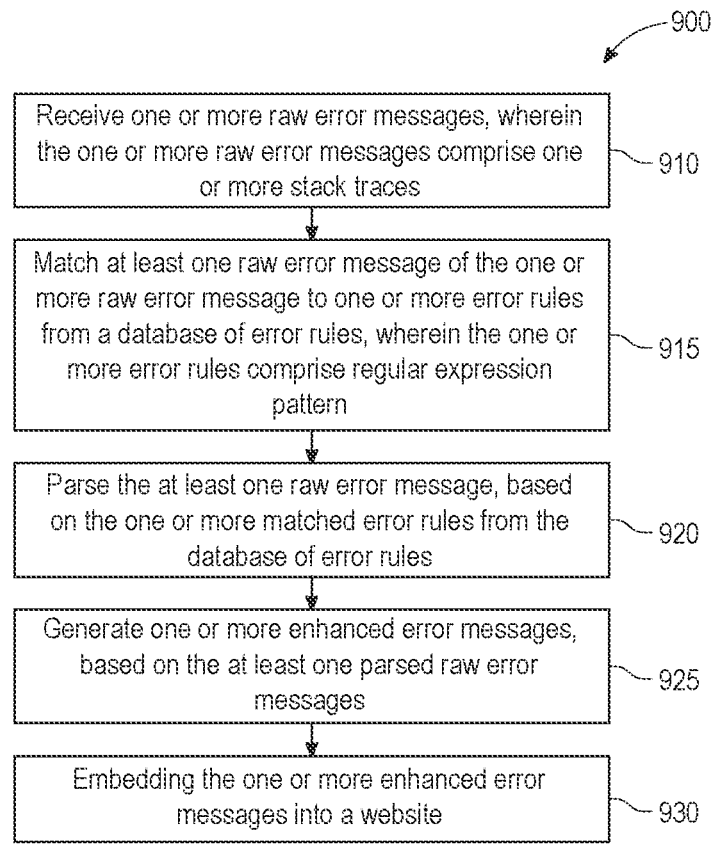
FIG. 9 illustrates a simplified diagram showing a method for generating an enhanced error message according to certain embodiments of the present disclosure.

FIG. 9 illustrates a simplified diagram showing a method 900 for generating an enhanced error message according to certain embodiments of the present disclosure. This diagram is merely an example. One of ordinary skill in the art would recognize many variations, alternatives, and modifications. The method 900 for generating an enhanced error message includes processes 910, 915, 920, 925, and 930. Although the above has been shown using a selected group of components and processes for the method 900 for generating an enhanced error message, there can be many alternatives, modifications, and variations. For example, some of the processes may be expanded and/or combined. Other components and/or processes may be inserted into those noted above. Depending upon the embodiment, the sequence of processes may be interchanged with others replaced. Further details of these processes are found throughout the present disclosure.

In some embodiments, some or all processes (e.g., steps) of the method 900 are performed by a system (e.g., the computing system 1100). In certain examples, some or all processes (e.g., steps) of the method 900 are performed by a computer and/or a processor directed by a code. For example, a computer includes a server computer and/or a client computer (e.g., a personal computer). In some examples, some or all processes (e.g., steps) of the method 900 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at the process 910, one or more raw error messages are received. In some embodiments, the one or more raw error messages include one or more stack traces. In some embodiments, a stack trace refers to a series of executable code and corresponding source code. In some embodiments, the stack trace includes a report of information about one or more subroutines of an algorithm.

According to some embodiments, at the process 915, at least one raw error message of the one or more raw error messages is matched to one or more error rules from a plurality of error rules. In some embodiments, the plurality of error rules are stored in a database or repository of error rules. In some embodiments, the one or more error rules include regular expression patterns.

According to some embodiments, at the process 920, the at least one raw error message is parsed, based on the one or more matched error rules from the plurality of error rules. In some embodiments, for each rule in the plurality of rules, a regular expression pattern corresponding to the respective rule, is matched against the raw error. In certain embodiments, if the raw error is determined to match a regular expression pattern of a rule from the plurality of rules, then relevant parts from the raw error (e.g., one or more strings from an error log or stack trace corresponding to the raw error 102) are extracted and used to generate an enhanced error (e.g., at process 925).

According to some embodiments, at the process 925, one or more enhanced error messages are generated, based on the at least one parsed raw error message. In some embodiments, the one or more enhanced error messages include a title and/or a description of the one or more raw error messages. In some embodiments, the one or more enhanced error messages include one or more natural language sentences. In some embodiments, the natural language sentence is a grammatically correct sentence. In some embodiments, a grammatically correct sentence is a sentence with a verb and/or a noun. In some embodiments, a grammatically correct sentence starts with a capital letter and/or ends with a punctuation mark that terminates the sentence (e.g., a period, exclamation mark, question mark).

In some embodiments, the one or more enhanced error messages include a portion of code from the one or more stack traces. In some embodiments, the one or more enhanced error messages include a recommendation to correct a problem associated with the one or more raw error messages.

According to some embodiments, at the process 930, the method 900 includes coupling to a software via a software plugin configured to provide a visual representation of the one or more enhanced error messages. In some examples, the coupling to a software includes embedding the one or more enhanced error messages into a website. In some examples, the software plugin is a frontend plugin (e.g., a virtual frontend plugin, etc.). In certain embodiments, a software plugin refers to a software component that adds a specific feature to a software. For example, a software plugin can retrieve and/or receive data (e.g., text data, code data, etc.) from a data source. In some embodiments, at the process 930, the one or more enhanced error messages are returned. In some embodiments, the one or more enhanced error messages are embedded into a virtual page (e.g., a website, a mobile application page, a virtual document page, etc.). For example, a virtual frontend plugin may be generated that embeds the one or more enhanced error messages into the virtual page.

In some embodiments, frontend embedding for a virtual page, such as a website, refers to the process of integrating and displaying content or components from one application (the source) into a virtual page (the destination). In some embodiments, this process allows developers to present content and functionalities from different sources seamlessly within a single user interface, such as to improve a user's experience.

In some embodiments, the method 900 further includes causing a problem associated with the one or more raw error messages to be corrected, based on the one or more enhanced error messages. For example, mechanisms provided herein may automatically correct the problem. As another example, a user may correct the problem, for example, based on a recommendation in the enhanced error message.

In some embodiments, a user interface is displayed that include the one or more enhanced error messages. In some embodiments, the user interface further includes an overall workflow design that includes a plurality of workflow levels. In some embodiments, the method 900 includes providing an indication of from which workflow level of the plurality of workflow levels the raw error message originated (e.g., which workflow level has a problem that needs to be corrected).

In some embodiments, the method 900 terminates at process 930. In some embodiments, the method 900 returns to process 910 or another process from method 900 to provide an iterative loop, such as of receiving one or more raw error messages, generating one or more enhanced error messages, and embedding the one or more enhanced error messages into a website.

Figure 10:
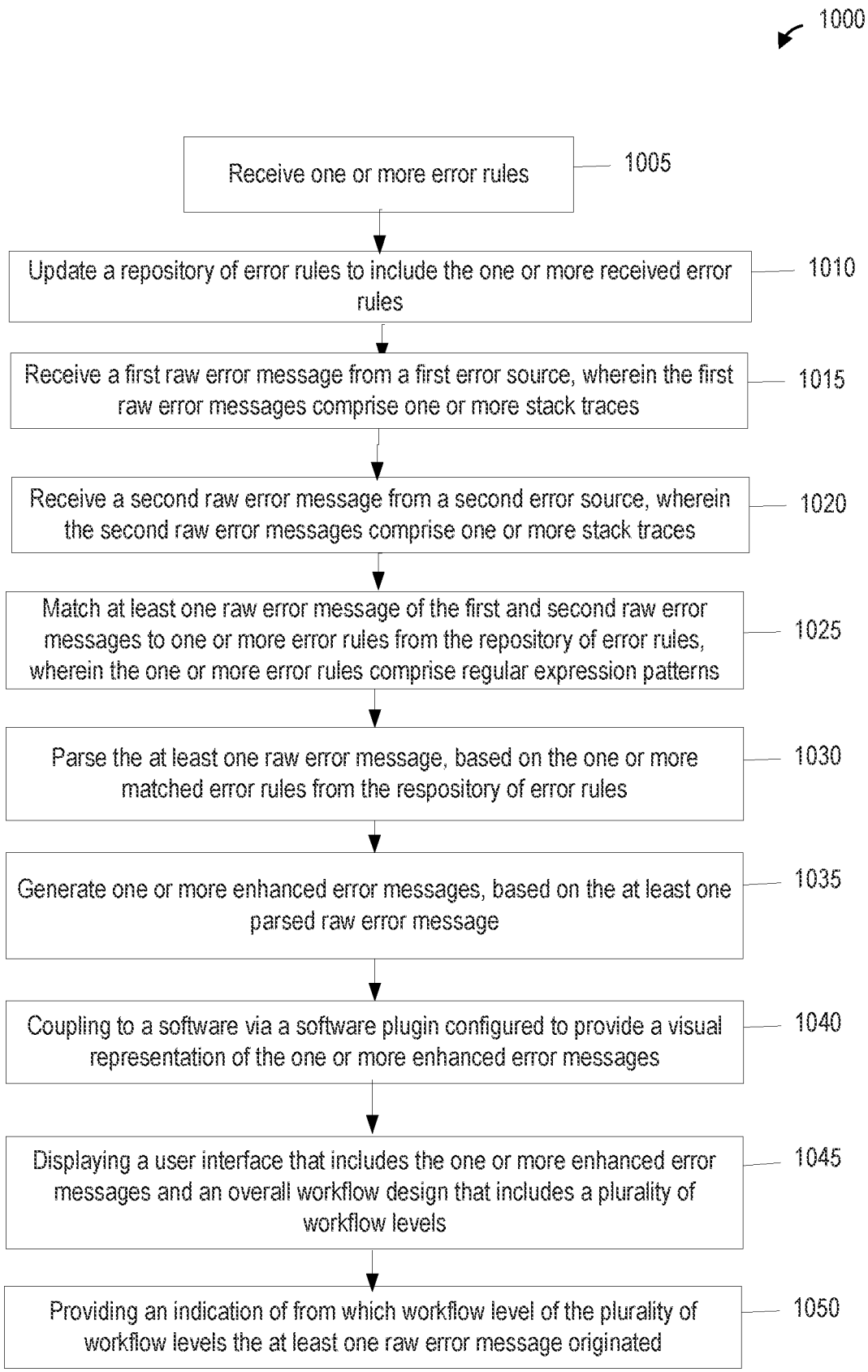
FIG. 10 illustrates a simplified diagram showing a method for generating an enhanced error message according to certain embodiments of the present disclosure.

FIG. 10 illustrates a simplified diagram showing a method 1000 for generating an enhanced error message according to certain embodiments of the present disclosure. This diagram is merely an example. One of ordinary skill in the art would recognize many variations, alternatives, and modifications. The method 1000 for generating an enhanced error message includes processes 1005, 1010, 1015, 1020, 1025, 1030, 1035, 1040, 1045, and 1050. Although the above has been shown using a selected group of components and processes for the method 1000 for generating an enhanced error message, there can be many alternatives, modifications, and variations. For example, some of the processes may be expanded and/or combined. Other components and/or processes may be inserted into those noted above. Depending upon the embodiment, the sequence of processes may be interchanged with others replaced. Further details of these processes are found throughout the present disclosure.

In some embodiments, some or all processes (e.g., steps) of the method 1000 are performed by a system (e.g., the computing system 1100). In certain examples, some or all processes (e.g., steps) of the method 1000 are performed by a computer and/or a processor directed by a code. For example, a computer includes a server computer and/or a client computer (e.g., a personal computer). In some examples, some or all processes (e.g., steps) of the method 1000 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at the process 1005, one or more error rules are received. For example, the error rules may be received by a user and/or a system who have identified how to identify and/or resolve a given error. In some embodiments, one or more error rules are contained in a database or repository, such as an open-source repository. In some embodiments, users can create error rules to contribute to the open-source repository. In some embodiments, users can create error rules for a plurality of different systems and/or a plurality of different programming languages with which raw errors may be associated. In some embodiments, error management components disclosed herein may be trained to correct problems, automatically, based on a generated enhanced error, thereby generating their own error rules. For example, if an enhanced error indicates that a word is misspelled, then error management components disclosed herein can generate an error rule to correct the spelling of the misspelled word.

According to some embodiments, at the process 1010, a repository of error rules is updated to include the one or more received errors (e.g., from the process 1005). In some examples, the repository is instead a database or a plurality of error rules.

According to some embodiments, at the process 1015, a first raw error message is received. In some embodiments, the first raw error message is received from a first source. In some embodiments, the first raw error message includes one or more stack traces. In some embodiments, a stack trace refers to a series of executable code and corresponding source code. In some embodiments, the stack trace includes a report of information about one or more subroutines of an algorithm.

According to some embodiments, at the process 1020, a second raw error message is received. In some embodiments, the second raw error message is received from a second source. In some embodiments, the second raw error messages include one or more stack traces. In some embodiments, a stack trace refers to a series of executable code and corresponding source code. In some embodiments, the stack trace includes a report of information about one or more subroutines of an algorithm.

In certain embodiments, the first and second error sources are a third-party software and the associated error message structure is provided by a third party. In some embodiments, the first error source is associated with a first software and the second error source is associated with a second software that is different from the first software, where the second error source is different from the first error source. In some embodiments, the error sources and/or the error message structures are predetermined at the time of execution of an error message component. In certain embodiments, an error message structure is associated with one or more error rules, that are generated by an error management component and/or received from the corresponding error source.

In some examples, the first error source generates raw error messages of a first type and the second error source generates raw error messages of a second types. In some examples, the first error source and the second error source generate raw error messages that are spaced apart in time. In some examples, the first error source and the second error source may generate raw error messages at the same time.

According to some embodiments, at the process 1025, at least one raw error message of the first and second raw error messages is matched to one or more error rules from the repository of error rules. In some embodiments, the repository of error rules are instead a database and/or a plurality of error rules. In some embodiments, the one or more error rules include regular expression patterns.

According to some embodiments, at the process 1030, the at least one raw error message is parsed, based on the one or more matched error rules from the repository of error rules. In some embodiments, for each rule in the repository of error rules, a regular expression pattern corresponding to the respective rule, is matched against the raw error. In certain embodiments, if the raw error is determined to match a regular expression pattern of a rule from the plurality of rules, then relevant parts from the raw error (e.g., one or more strings from an error log or stack trace corresponding to the raw error 102) are extracted and used to generate an enhanced error (e.g., at process 1035).

According to some embodiments, at the process 1035, one or more enhanced error messages are generated, based on the at least one parsed raw error message. In some embodiments, the one or more enhanced error messages include a title and/or a description of the one or more raw error messages. In some embodiments, the one or more enhanced error messages include one or more natural language sentences. In some embodiments, the natural language sentences are grammatically correct sentences. In some embodiments, a grammatically correct sentence is a sentence with a verb and/or a noun. In some embodiments, a grammatically correct sentence starts with a capital letter and/or ends with a punctuation mark that terminates the sentence (e.g., a period, exclamation mark, question mark).

In some embodiments, the one or more enhanced error messages include a portion of code from the one or more stack traces. In some embodiments, the one or more enhanced error messages include a recommendation to correct a problem associated with the one or more raw error messages.

According to some embodiments, at the process 1040, the method 1000 includes coupling to a software via a software plugin configured to provide a visual representation of the one or more enhanced error messages. In some examples, the coupling to a software includes embedding the one or more enhanced error messages into a website. In some examples, the software plugin is a frontend plugin. In some embodiments, at the process 1040, the one or more enhanced error messages are returned. In some embodiments, the one or more enhanced error messages are embedded into a virtual page (e.g., a website, a mobile application page, a virtual document page, etc.). For example, a virtual frontend plugin may be generated that embeds the one or more enhanced error messages into the virtual page.

In some embodiments, frontend embedding for a virtual page, such as a website, refers to the process of integrating and displaying content or components from one application (the source) into a virtual page (the destination). In some embodiments, this process allows developers to present content and functionalities from different sources seamlessly within a single user interface, such as to improve a user's experience.

In some embodiments, the method 1000 further includes causing a problem associated with the one or more raw error messages to be corrected, based on the one or more enhanced error messages. For example, mechanisms provided herein may automatically correct the problem. As another example, a user may correct the problem, for example, based on a recommendation in the enhanced error message.

According to some embodiments, at the process 1045, a user interface is displayed that includes the one or more enhanced error messages. In some embodiments, the user interface further includes an overall workflow design that includes a plurality of workflow levels. For example, the user interface may be displayed on a display screen, such as a display screen of a computing device.

According to some embodiments, at the process 1050, an indication is provided of from which workflow level of the plurality of workflow levels the at least one raw error message originated (e.g., which workflow level has a problem that needs to be corrected based on the first and/or second raw error messages). In some examples, the indication is a visual indication. In some examples, the indication is an audio indication.

In some embodiments, the method 1000 terminates at process 1050. In some embodiments, the method 1000 returns to process 1005 or another process from method 1000 to provide an iterative loop.

Figure 11:
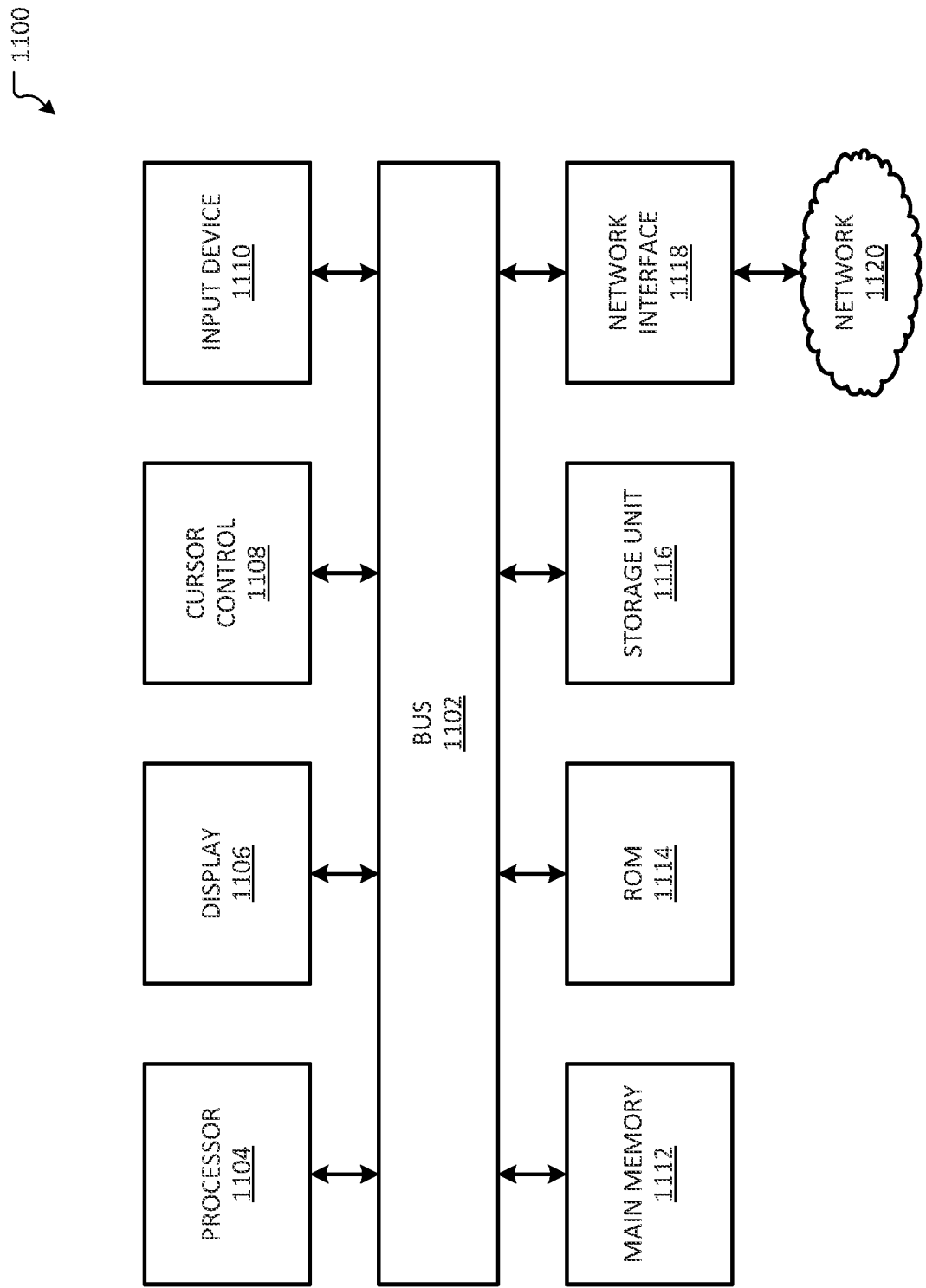
FIG. 11 is a simplified diagram showing a computing system for implementing a system for generating an enhanced error message, according to certain embodiments of the present disclosure.

FIG. 11 is a simplified diagram showing a computing system for implementing a system 1100 for generating an enhanced error message in accordance with at least one example set forth in the disclosure. This diagram is merely an example, which should not unduly limit the scope of the claims. One of ordinary skill in the art would recognize many variations, alternatives, and modifications.

The computing system 1100 includes a bus 1102 or other communication mechanism for communicating information, a processor 1104, a display 1106, a cursor control component 1108, an input device 1110, a main memory 1112, a read only memory (ROM) 1114, a storage unit 1116, and a network interface 1118. In some embodiments, some or all processes (e.g., steps) of methods and/or processes disclosed herein are performed by the computing system 1100. In some embodiments, the bus 1102 is coupled to the processor 1104, the display 1106, the cursor control component 1108, the input device 1110, the main memory 1112, the read only memory (ROM) 1114, the storage unit 1116, and/or the network interface 1118. In certain embodiments, the network interface is coupled to a network 1120. For example, the processor 1104 includes one or more general purpose microprocessors. In some embodiments, the main memory 1112 (e.g., random access memory (RAM), cache and/or other dynamic storage devices) is configured to store information and instructions to be executed by the processor 1104. In certain embodiments, the main memory 1112 is configured to store temporary variables or other intermediate information during execution of instructions to be executed by processor 1104. For example, the instructions, when stored in the storage unit 1116 accessible to processor 1104, render the computing system 1100 into a special-purpose machine that is customized to perform the operations specified in the instructions. In some embodiments, the ROM 1114 is configured to store static information and instructions for the processor 1104. In certain embodiments, the storage unit 1116 (e.g., a magnetic disk, optical disk, or flash drive) is configured to store information and instructions.

In some embodiments, the display 1106 (e.g., a cathode ray tube (CRT), an LCD display, or a touch screen) is configured to display information to a user of the computing system 1100. In some embodiments, the input device 1110 (e.g., alphanumeric and other keys) is configured to communicate information and commands to the processor 1104. For example, the cursor control component 1108 (e.g., a mouse, a trackball, or cursor direction keys) is configured to communicate additional information and commands (e.g., to control cursor movements on the display 1106) to the processor 1104.

According to certain embodiments, a method for generating an enhanced error message is provided. The method includes receiving one or more raw error messages. The one or more raw error messages include one or more stack traces. The method further includes matching at least one raw error message of the one or more raw error messages to one or more error rules from a plurality of error rules. The one or more error rules include regular expression patterns. The method further includes parsing the at least one raw error message, based on the one or more matched error rules from the plurality of error rules; and generating one or more enhanced error messages, based on the at least one parsed raw error messages. The one or more enhanced error messages include one or more natural language sentences. The method further includes embedding the one or more enhanced error messages into a website. The method is performed using one or more processors. For example, the method is implemented according to at least FIGS. 1, 9, and 10.

In some embodiments, the one or more enhanced error messages comprise a title and a description of the one or more raw error messages. In some embodiments, the coupling to a software comprises embedding the one or more enhanced error messages into a website, via the software plugin. In some embodiments, the one or more enhanced error messages comprise a portion of code from the one or more stack traces. In some embodiments, the one or more enhanced error messages comprise a recommendation to correct a problem associated with the one or more raw error messages. In some embodiments, the method further comprises causing a problem associated with the one or more raw error messages to be corrected, based on the one or more enhanced error messages. In some embodiments, the method further comprises displaying a user interface comprising the one or more enhanced error messages. In some embodiments, the user interface further comprises a workflow design including a plurality of workflow levels. In some embodiments, the method further comprises providing an indication of from which workflow level of the plurality of workflow levels the raw error message originated.

According to certain embodiments, a system for generating an enhanced error message is provided. The system includes one or more processors and one or more memories having instructions that, when executed by the one or more processors, cause the system to perform a set of operations that include receiving one or more raw error messages. The one or more raw error messages include one or more stack traces. The set of operations further include matching at least one raw error message of the one or more raw error messages to one or more error rules from a plurality of error rules. The one or more error rules include regular expression patterns. The set of operations further include parsing the at least one raw error message, based on the one or more matched error rules from the plurality of error rules; and generating one or more enhanced error messages, based on the at least one parsed raw error messages. The one or more enhanced error messages include one or more natural language sentences. The set of operations further include embedding the one or more enhanced error messages into a website. For example, the system is implemented according to at least FIGS. 1, 9, and 10.

In some embodiments, the one or more enhanced error messages comprise a title and a description of the one or more raw error messages. In some embodiments, the coupling to a software comprises embedding the one or more enhanced error messages into a website, via the software plugin. In some embodiments, the one or more enhanced error messages comprise a portion of code from the one or more stack traces that is relevant to the one or more raw error messages. In some embodiments, the one or more enhanced error messages comprise a recommendation to correct a problem associated with the one or more raw error messages. In some embodiments, the set of operations further comprises: causing a problem associated with the one or more raw error messages to be corrected, based on the one or more enhanced error messages. In some embodiments, the set of operations further comprises: displaying a user interface comprising the one or more enhanced error messages. In some embodiments, the user interface further comprises a workflow design including a plurality of workflow levels. In some embodiments, the set of operations further comprises: providing an indication of from which workflow level of the plurality of workflow levels the raw error message originated.

According to certain embodiments, a method for generating an enhanced error message is provided. The method includes receiving one or more raw error messages. The one or more raw error messages include one or more stack traces. The method further includes matching at least one raw error message of the one or more raw error messages to one or more error rules from a plurality of error rules. The one or more error rules include regular expression patterns. The method further includes parsing the at least one raw error message, based on the one or more matched error rules from the plurality of error rules; and generating one or more enhanced error messages, based on the at least one parsed raw error messages. The one or more enhanced error messages include a title, a description of the one or more raw error messages, a portion of code from the one or more stack traces that is relevant to the one or more raw error messages, and a recommendation to correct a problem associated with the one or more raw error messages. The method further includes embedding the one or more enhanced error messages into a website. For example, the method is implemented according to at least FIGS. 1, 9, and 10.

In some embodiments, the method further comprises: causing a problem associated with the one or more raw error messages to be corrected, based on the one or more enhanced error messages. In some embodiments, the method further comprises: displaying a user interface comprising the one or more enhanced error messages. In some embodiments, the user interface further comprises a workflow design including a plurality of workflow levels. In some embodiments, the method further comprises: providing an indication of from which workflow level of the plurality of workflow levels the raw error message originated.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various aspects of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented, for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method for generating an enhanced error message, the method comprising:
    receiving one or more raw error messages, wherein the one or more raw error messages comprise one or more indications of one or more stack traces;
    matching one raw error message of the one or more raw error messages to one or more error rules from a plurality of error rules, wherein the one or more error rules comprise regular expression patterns, and wherein the matching comprises:
        calculating a plurality of similarity scores between the one raw error message and the plurality of error rules by at least:
            determining a respective similarity score between a first string in the one raw error message and a second string in a respective error rule of the plurality of error rules;
        comparing the plurality of similarity scores to a predetermined threshold; and
        determining, based on the comparing, that the one raw error message matches to the one or more error rules from the plurality of error rules;
    parsing the one raw error message based on the one or more matched error rules from the plurality of error rules;
    generating an enhanced error message, based on the one parsed raw error message, wherein the enhanced error message comprises one or more natural language sentences, and wherein the one or more natural language sentences comprise a recommendation to correct a problem associated with the one raw error message;
    coupling to a software via a software plugin configured to provide a visual representation of the enhanced error message; and
    causing the problem associated with the one raw error message to be corrected by changing code relevant to the one raw error message, based on the recommendation in the enhanced error message;
    wherein the method is performed using one or more processors.

2. The method of claim 1, wherein the enhanced error message comprise a title and a description of the one raw error message.

3. The method of claim 2, wherein the coupling to a software comprises embedding the enhanced error message into a website, via the software plugin.

4. The method of claim 1, further comprising:
    displaying a user interface comprising the enhanced error message.

5. The method of claim 4, wherein the user interface further comprises a workflow design including a plurality of workflow levels.

6. The method of claim 5, further comprising:
    providing an indication of from which workflow level of the plurality of workflow levels the raw error message originated.

7. The method of claim 1, wherein the one or more natural language sentences comprise a grammatically correct sentence with a verb and a noun.

8. The method of claim 1, wherein each error rule of the plurality of error rules is defined by a data structure.

9. The method of claim 8, wherein the data structure comprises an identifier, a description, and identified patterns within a previous raw error message.

10. The method of claim 9, wherein the data structure further comprises a link to a document relevant to the error rule with which the data structure corresponds.

11. A system for generating an enhanced error message, the system comprising:
    one or more processors; and
    one or more memories having instructions stored thereon that, when executed by the one or more processors, cause the system to perform a set of operations comprising:
        receiving one or more raw error messages, wherein the one or more raw error messages comprise one or more stack traces;
        matching one raw error message of the one or more raw error messages to one or more error rules from a plurality of error rules, wherein the one or more error rules comprise regular expression patterns, and wherein the matching comprises:
            calculating a plurality of similarity scores between the one raw error message and the plurality of error rules by at least:
                determining a respective similarity score between a first string in the one raw error message and a second string in a respective error rule of the plurality of error rules;
            comparing the plurality of similarity scores to a predetermined threshold; and
            determining, based on the comparing, that the one raw error message matches to the one or more error rules from the plurality of error rules;
        parsing the one raw error message, based on the one or more matched error rules from the plurality of error rules;
        generating an enhanced error message, based on the one parsed raw error message, wherein the enhanced error message comprises messages comprise one or more natural language sentences, and wherein the one or more natural language sentences comprise a recommendation to correct a problem associated with the one raw error message;

coupling to a software via a software plugin configured to provide a visual representation of the enhanced error message; and causing the problem associated with the one raw error message to be corrected by changing code relevant to the one raw error message, based on the recommendation in the enhanced error message.

12. The system of claim 11, wherein the enhanced error message comprises a title and a description of the one raw error message.

13. The system of claim 12, wherein the coupling to a software comprises embedding the enhanced error message into a website, via the software plugin.

14. The system of claim 11, wherein the set of operations further comprises:

displaying a user interface comprising the enhanced error message.

15. The system of claim 14, wherein the user interface further comprises a workflow design including a plurality of workflow levels.

16. The system of claim 15, wherein the set of operations further comprises:

providing an indication of from which workflow level of the plurality of workflow levels the raw error message originated.

17. A method for generating an enhanced error message, the method comprising:

receiving one or more raw error messages, wherein the one or more raw error messages comprise one or more stack traces;

matching one raw error message of the one or more raw error messages to one or more error rules from a plurality of error rules, wherein the one or more error rules comprise regular expression patterns, and wherein the matching comprises:

calculating a plurality of similarity scores between the one raw error message and the plurality of error rules by at least:

determining a respective similarity score between a first string in the one raw error message and a second string in a respective error rule of the plurality of error rules;

comparing the plurality of similarity scores to a predetermined threshold; and determining, based on the comparing, that the one raw error message matches to the one or more error rules from the plurality of error rules;

parsing the one raw error message, based on the one or more matched error rules from the plurality of error rules;

generating an enhanced error message, based on the one parsed raw error message, wherein the enhanced error message comprises a title, a description of the one or more raw error messages, a portion of code from the one or more stack traces that is relevant to the one or more raw error messages, and one or more natural language sentences comprising a recommendation to correct a problem associated with the one or more raw error messages;

coupling to a software via a software plugin configured to provide a visual representation of the enhanced error message; and causing the problem associated with the one or more raw error messages to be corrected by changing code relevant to the one raw error message, based on the recommendation in the enhanced error message, wherein the method is performed using one or more processors.

18. The method of claim 17, further comprising:

displaying a user interface comprising the enhanced error message.

19. The method of claim 18, wherein the user interface further comprises a workflow design including a plurality of workflow levels, and wherein the method further comprises:

providing an indication of from which workflow level of the plurality of workflow levels the raw error message originated.

20. The method of claim 17, wherein the one or more natural language sentences comprise a grammatically correct sentence with a verb and a noun.

* * * * *